(12) United States Patent
Morse et al.

(10) Patent No.: US 9,941,557 B2
(45) Date of Patent: Apr. 10, 2018

(54) BATTERY SYSTEM COOLING SYSTEMS AND METHODS

(71) Applicant: GM GLOBAL TECHNOLOGY OPERATIONS LLC, Detroit, MI (US)

(72) Inventors: Andrew G. Morse, Macomb, MI (US); Jared J. Keyes, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 62 days.

(21) Appl. No.: 14/630,019

(22) Filed: Feb. 24, 2015

(65) Prior Publication Data
US 2016/0248134 A1    Aug. 25, 2016

(51) Int. Cl.
| | |
|---|---|
| *H01M 10/6557* | (2014.01) |
| *H01M 10/613* | (2014.01) |
| *H01M 10/625* | (2014.01) |
| *H01M 2/10* | (2006.01) |

(52) U.S. Cl.
CPC ..... *H01M 10/6557* (2015.04); *H01M 2/1077* (2013.01); *H01M 10/613* (2015.04); *H01M 10/625* (2015.04); *H01M 2220/20* (2013.01)

(58) Field of Classification Search
CPC ........... H01M 10/6557; H01M 10/613; H01M 10/625; H01M 2220/20
See application file for complete search history.

(56) References Cited

U.S. PATENT DOCUMENTS

| | | | | |
|---|---|---|---|---|
| 6,296,968 | B1 * | 10/2001 | Verhoog | B60L 11/1874 29/623.1 |
| 2011/0212355 | A1 * | 9/2011 | Essinger | H01M 2/1016 429/120 |
| 2012/0237805 | A1 * | 9/2012 | Abels | H01M 2/1077 429/83 |
| 2014/0050952 | A1 * | 2/2014 | Merriman | F28F 9/0243 429/72 |
| 2016/0003553 | A1 * | 1/2016 | Campbell | H01M 10/625 165/166 |

FOREIGN PATENT DOCUMENTS

WO    WO2014/132047    9/2014

OTHER PUBLICATIONS

US Department of Energy, "Central Air Conditioning",http://energy.gov/energysaver/central-air-conditioning, accessed Sep. 30, 2016.*

* cited by examiner

*Primary Examiner* — Devina Pillay
(74) *Attorney, Agent, or Firm* — Phillips Ryther & Winchester; John P. Davis (57) ABSTRACT

System and methods are disclosed incorporating a battery cooling system design that may provide for relatively uniform cooling of an associated battery system. In certain embodiments, a battery cooling system may include a central coolant delivery system configured to circulate liquid coolant through one or more coolant flow channels included in one or more cooling plates. One or more seals may be used to couple the central coolant delivery system to the one or more coolant delivery plates. Embodiments of the disclosed battery cooling system may allow for relatively straightforward manufacturing processes and/or assembly of the cooling system, provide sufficient mechanical strength to support a group of battery packs, reduce the occurrence of liquid coolant leaks, and/or provide for relatively uniform cooling of a group of battery packs.

16 Claims, 10 Drawing Sheets

Figure 11

BATTERY SYSTEM COOLING SYSTEMS AND METHODS

TECHNICAL FIELD

This disclosure relates to battery cooling systems and methods. More specifically, but not exclusively, this disclosure relates to a battery cooling system design that may provide for relatively uniform cooling of an associated battery system.

BACKGROUND

Passenger vehicles often include electric batteries for operating features of vehicle electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system may be used to power electric drivetrain components (e.g., electric drive motors and the like).

In certain designs, battery systems included in a vehicle may be liquid-cooled. For example, to dissipate heat generated by a HV battery, which may comprise a plurality of cells and/or sub-batteries configured in series and/or in parallel, a HV battery system may include a cooling system configured to cool the HV battery using a liquid coolant. A consideration in designing a battery cooling system is reducing and/or otherwise preventing the occurrence of coolant leaks from the cooling system. Leaked coolant may cause a variety of issues including, for example, electrical malfunctions and/or thermal events. Conventional battery cooling systems designs, however, may involve the use of relatively complex and/or otherwise expensive manufacturing methods to reduce the occurrence of coolant leaks.

SUMMARY

Systems and methods are presented incorporating a battery cooling system design that may provide for relatively uniform cooling of an associated battery system. In certain embodiments, a battery cooling system may include a central coolant delivery system configured to circulate liquid coolant through one or more coolant flow channels included in one or more cooling plates. Among other things, embodiments of the battery cooling system disclosed herein may allow for relatively straightforward manufacturing processes and/or assembly of the cooling system, provide sufficient mechanical strength and/or rigidity to structurally support a group of batteries and/or a plurality of constituent battery packs, reduce the occurrence of liquid coolant leaks, and/or provide for relatively uniform cooling (e.g., simultaneous cooling) of a group of batteries and/or a plurality of constituent battery packs.

In certain embodiments, cooling plates included in a cooling system may comprise an isolation film disposed on one or more sides and/or surfaces of the cooling plates. The isolation film may be configured to isolate batteries and/or battery packs from the cooling system plates supporting the batteries and/or packs. Embodiments of the battery cooling system design disclosed herein may, among other things, allow for separate brazing of sheets to form cooling system plates during manufacture. After brazing, the isolation film may then be separately applied to the cooling system plates. In certain embodiments, the separate brazing of the sheets may facilitate easier application of the isolation film than a one-shot braze, which may introduce certain difficulties in connection with applying the isolation film. The plates may then be mechanically coupled with a seal to the central coolant delivery system (e.g., via a compression fit mechanism, an o-ring mechanism, and/or the like). In some embodiments, the plates may be bent to create spaced openings to receive an associated sub-component of the battery system. Embodiments of the disclosed battery cooling system may be scalable to accommodate varied battery sizes and/or configurations and facilitate thermal expansion of the associated battery system over time.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Figure 1:
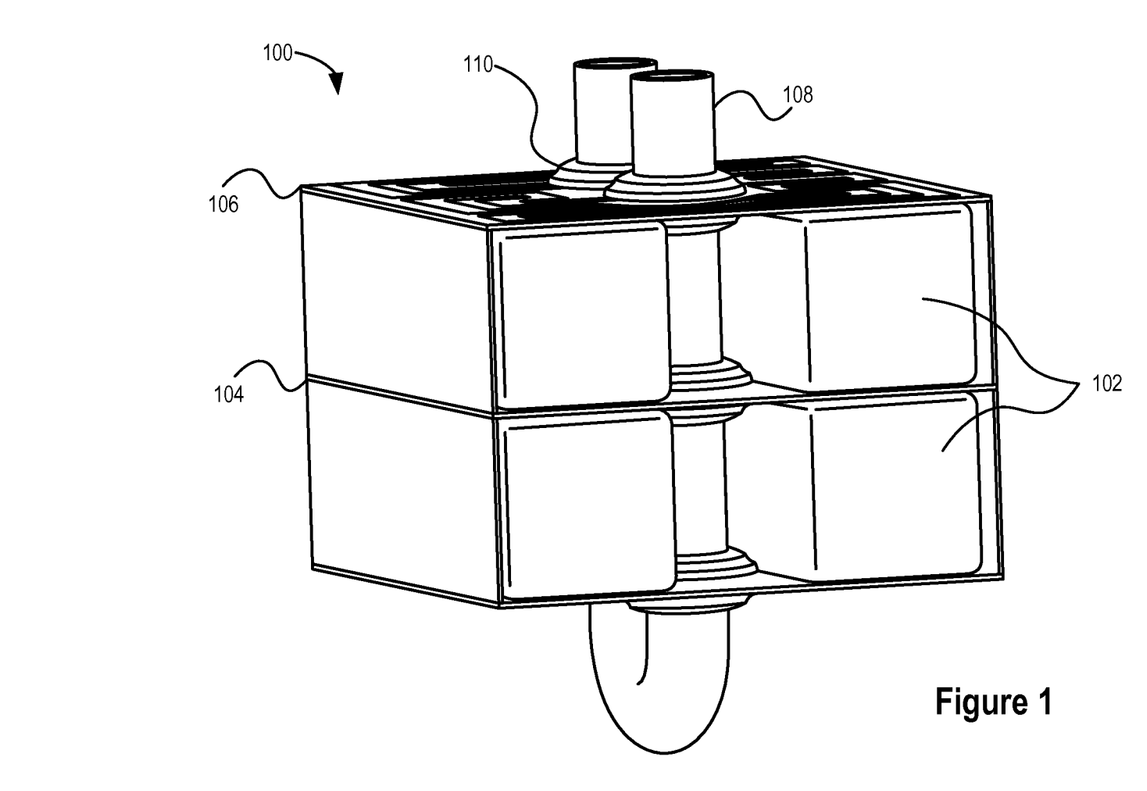
FIG. 1 illustrates a battery system including a battery cooling system consistent with embodiments disclosed herein.

FIG. 1 illustrates a perspective view of a battery system 100 including a battery cooling system consistent with embodiments disclosed herein. In certain embodiments, the battery system 100 may be included in a vehicle (not shown). The vehicle may be a motor vehicle, a marine vehicle, an aircraft, and/or any other type of vehicle, and may include an internal combustion engine ("ICE") drivetrain, an electric motor drivetrain, a hybrid engine drivetrain, an FC drivetrain, and/or any other type of drivetrain suitable for incorporating the systems and methods disclosed herein. In some embodiments, the battery system 100 may comprise a high voltage ("HV") battery system, and may be used to power electric drivetrain components of the vehicle (e.g., as in an electric, hybrid, or FC power system). In further embodiments, the battery system 100 may be a low voltage battery (e.g., a lead-acid 12V automotive battery) and may be configured to supply electric energy to a variety of vehicle systems including, for example, vehicle starter systems (e.g., a starter motor), lighting systems, ignition systems, and/or the like.

The battery system 100 may include one or more battery packs 102 suitably sized to provide sufficient electrical power to meet demands of the battery system (e.g., sufficient to power an associated vehicle drivetrain and/or the like). Each battery pack 102 may include one or more constituent battery modules. The battery modules may comprise one or more battery cells utilizing any suitable battery technology including, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or any other suitable battery technologies.

Under normal operation (e.g., charging and/or discharging), the battery system 100 and/or associated systems may produce heat. In certain circumstances, however, the temperature of the battery system 100 may affect battery performance. For example, battery temperature may affect operation of an electrochemical system included in the battery system 100, performance of a vehicle associated with the battery system 100, round trip efficiency and/or charge acceptance of the battery system 100, power and energy of the battery system 100, safety and reliability of the battery system 100, and/or life and life cycle cost of the battery 100. To regulate the temperature of the battery system 100, the battery system 100 may include a liquid cooling system.

The liquid cooling system may be configured to circulate and/or distribute a liquid coolant through one or more flow channels proximately disposed by various components and/or systems included in the battery system 100, thereby regulating the temperature of the components and/or systems. In certain embodiments, the liquid cooling system may be further configured to circulate the liquid coolant to various components and/or systems included elsewhere in an associated vehicle. By utilizing a liquid cooling system to regulate temperature of the battery system 100 (e.g., regulate the temperature within a desired range), the performance of the battery system 100 may be improved, uneven temperature distributions and unbalanced battery packs 102 in the battery system 100 may be reduced, and/or potential hazards attributable to uncontrolled battery temperature may be mitigated.

In certain embodiments, the liquid cooling system may comprise one or more cooling plates 104, 106. The one or more plates 104, 106 may comprise any suitable material including, for example, steel, stainless steel, titanium, aluminum, and/or the like. The cooling system plates 104, 106 may provide structural support and/or otherwise retain the battery packs 102 included in the battery system 100. Although FIG. 1, illustrates two battery packs 102 included in battery system 100 supported by cooling system plates 104, 106, it will be appreciated that embodiments of the disclosed systems and methods are scalable. Accordingly, any suitable number of battery packs may be associated with any suitable number cooling system plates 104, 106 consistent with the disclosed embodiments.

In certain embodiments, the cooling plates 104, 106 may define one or more flow channels. In certain embodiments, the one or more flow channels may be coupled to a central coolant delivery system 108 (e.g., via one or more seals 110 or the like). The central coolant delivery system 108 may be configured to circulate liquid coolant through the one or more coolant flow channels defined by one or more cooling plates 104, 106. In certain embodiments, the coolant flow channels may be disposed proximate to the battery packs 102. Accordingly, when liquid coolant is circulated through the one or more coolant channels, the temperature of the battery packs 102 may be regulated.

The cooling system may further comprise any suitable number of pumps, valves coolant circulation paths (e.g., piping), coolant reservoirs, heat exchangers (e.g., liquid/liquid, liquid/air, liquid/AC unit, and the like), cooling system electronics (e.g., feedback mechanisms, temperature sensors, thermostats, coolant flow sensors, pump and heat exchanger control electronics, and the like), and/or any other cooling system component and/or system in any suitable configuration for circulating the liquid coolant to various components and systems included in the battery system 100, including any of the components described herein. The liquid coolant may be a substantially aqueous coolant solution. In some embodiments, the liquid coolant may comprise any combination and/or concentration of water, methanol, glycol, ethylene glycol, propylene glycol, glycerol, Dex-Cool®, and/or any other suitable coolant material.

Figure 2:
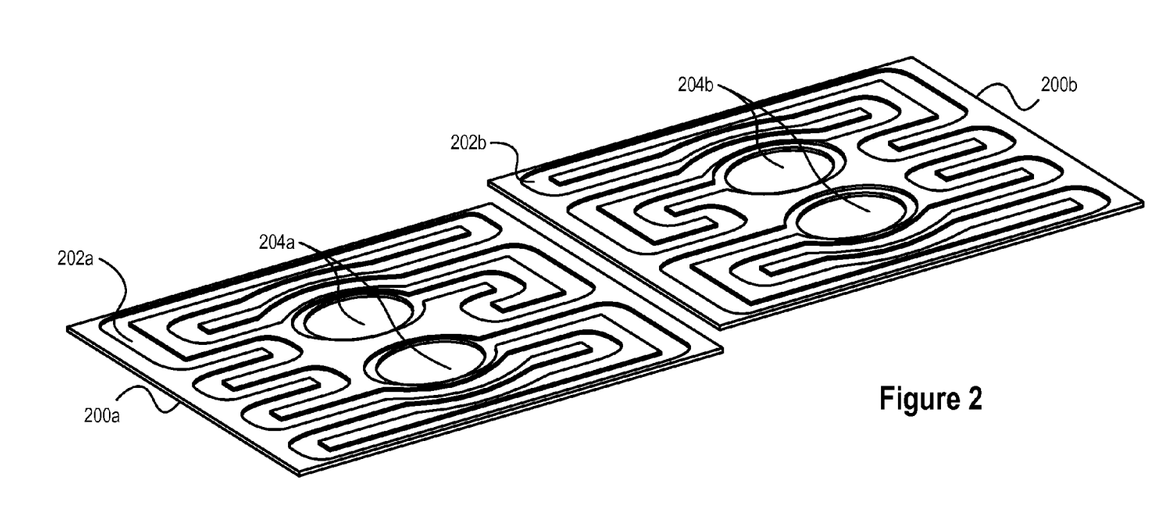
FIG. 2 illustrates sheets used to form cooling plates of a battery cooling system consistent with embodiments disclosed herein.

FIG. 2 illustrates sheets 200a, 200b used to form a cooling plate of a battery cooling system consistent with embodiments disclosed herein. In certain embodiments, sheets 200a, 200b may comprise one or more channel areas 202a, 202b. In some embodiments, the one or more channel areas 202a, 202b may comprise raised and/or depressed portions of the sheets 200a, 200b that, when sheets 200a, 200b are joined together to form a cooling plate, define one or more flow channels. As illustrated, in further embodiments, sheets 200a, 200b may further include one or more central coolant delivery system openings 204a, 204b configured to receive a central coolant delivery system (not shown) and facilitate flow of coolant from the central coolant delivery system through the one or more flow channels defined by sheets 200a, 200b. Sheets 200a, 200b may be formed using any suitable manufacturing process and/or combination or manufacturing processes including, for example, machining, molding, stamping, casting, and/or the like.

In certain embodiments, flow channels defined by sheets 200a, 200b may be arranged in a variety of configurations. For example, as illustrated, sheets 200a, 200b may define flow channels in a serpentine and/or partially-serpentine configuration. In other embodiments, the flow channels may be configured to circulate coolant in certain areas proximate to battery packs associated with the cooling system and/or portions of battery packs associated with the cooling system. For example, the flow channels may be configured to circulate coolant proximate to portions of the battery packs that may generate more heat and/or the like.

Figure 3:
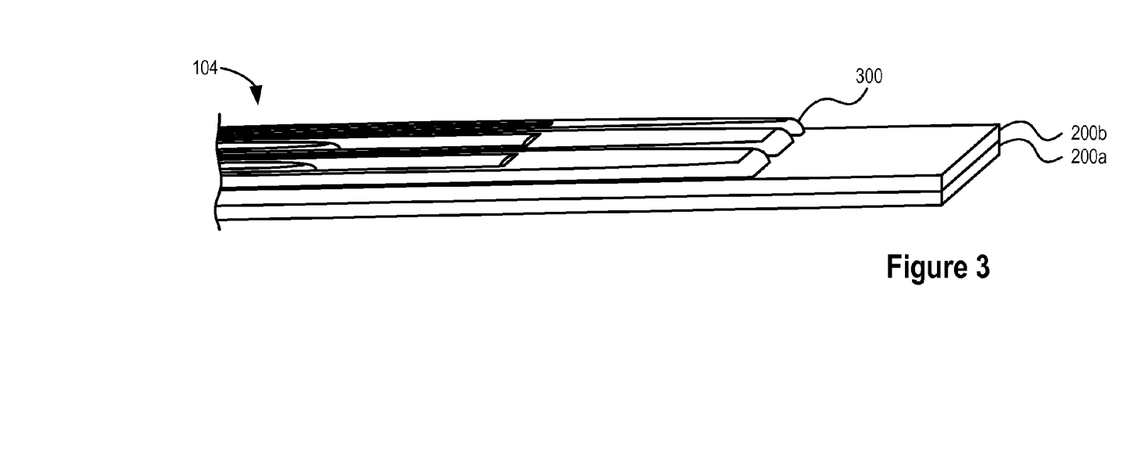
FIG. 3 illustrates a cooling plate of a battery cooling system consistent with embodiments disclosed herein.

FIG. 3 illustrates a cooling plate 104 of a battery cooling system consistent with embodiments disclosed herein. As discussed above, sheets 200a, 200b may be joined together to form a cooling plate 106 defining one or more flow channels 300 through which coolant may flow. Sheets 200a, 200b may be joined together in a variety of ways including, for example, brazing, welding, and/or any other bonding process to form the cooling plate 106. In certain embodiments, sheets 200a, 200b may be joined together to form the cooling plate 104 in a single and/or otherwise one-shot brazing process.

In some embodiments, after joining together sheets 200a, 200b to form the cooling plate 104, the outer surfaces of the cooling plate 104 may be coated with an isolation film. The isolation film may provide isolation between the cooling plate 106 and/or an associated battery system and/or battery pack. In certain embodiments, the isolation film may mitigate degradation of the cooling plate 104 over time (e.g., degradation caused by operation of the associated battery system).

Figure 4A:
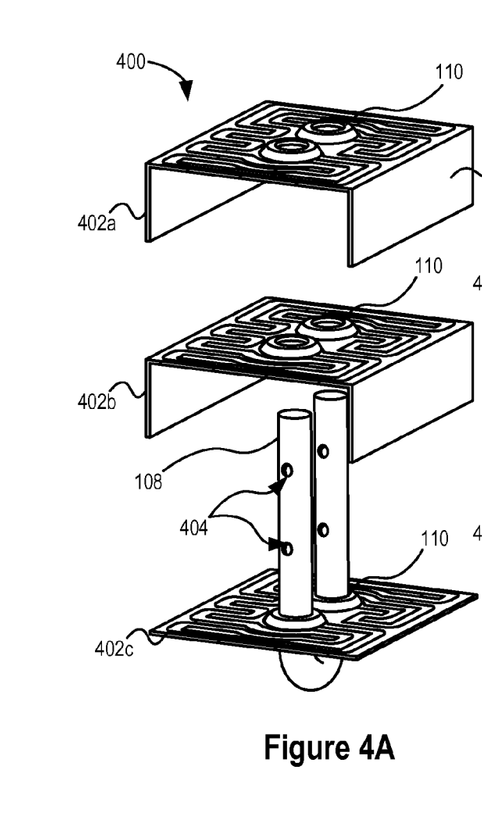
FIG. 4A illustrates a view of assembly of a battery cooling system consistent with embodiments disclosed herein.
Figure 4B:
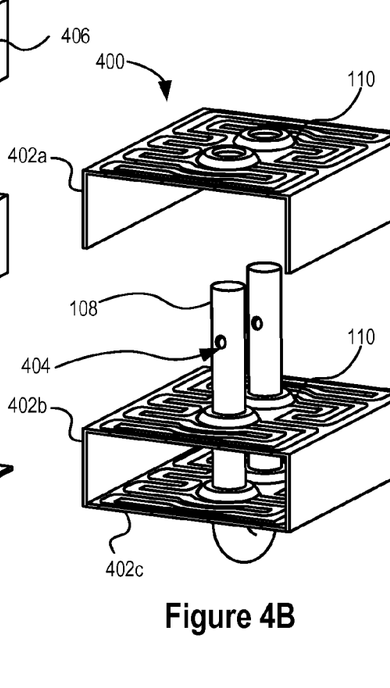
FIG. 4B illustrates another view of assembly of a battery cooling system consistent with embodiments disclosed herein.
Figure 4C:
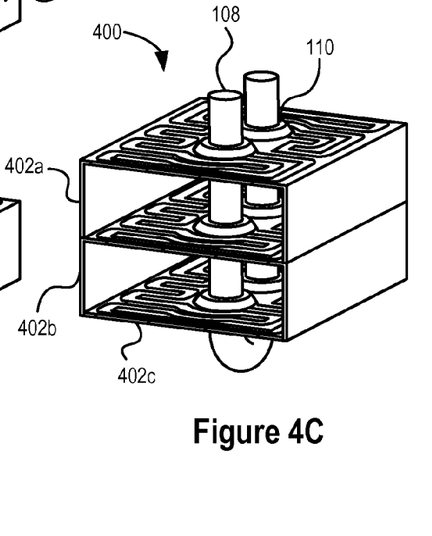
FIG. 4C illustrates yet another view of assembly of a battery cooling system consistent with embodiments disclosed herein.

FIGS. 4A-4C illustrate assembly of a battery cooling system 400 consistent with embodiments disclosed herein. The battery cooling system 400 may comprise one or more cooling system plates 402a-402c. The cooling system plates 402a-402c may provide structural support and/or otherwise retain battery packs included in an associated battery system (not shown). As illustrated, in certain embodiments, the cooling system plates 402a-402c may be assembled in a stacked configuration around a central coolant delivery system 108. In some embodiments, the cooling system plates 402a-402c may comprise one or more members 406 (e.g., formed by a bend in the plates 402a-402c and/or the like) configured to align and/or otherwise ensure that the cooling system plates 402a-402c are spaced at a particular distance relative to each other, thereby ensuring consistent spaces for retaining associated battery packs and/or relative alignment of the cooling system plates 402a-402c and the central coolant delivery system 108.

During assembly, the cooling system plates 402a-402c may be configured to align with one or more coolant distribution openings 404 of the central coolant delivery system 108 such that circulated coolant may flow from the coolant distribution openings 404 through the one or more flow channels of the cooling system plates 402a-402c during operation of the cooling system 400. As described in more detail below, a seal 110 may couple the central coolant delivery system 108 to the cooling system plates 402a-402c. Among other things, the seal may 110 may ensure that coolant does not leak from the interface between the coolant system plates 402a-402c and the central coolant delivery system 108 during operation of the cooling system 400.

Figure 5A:
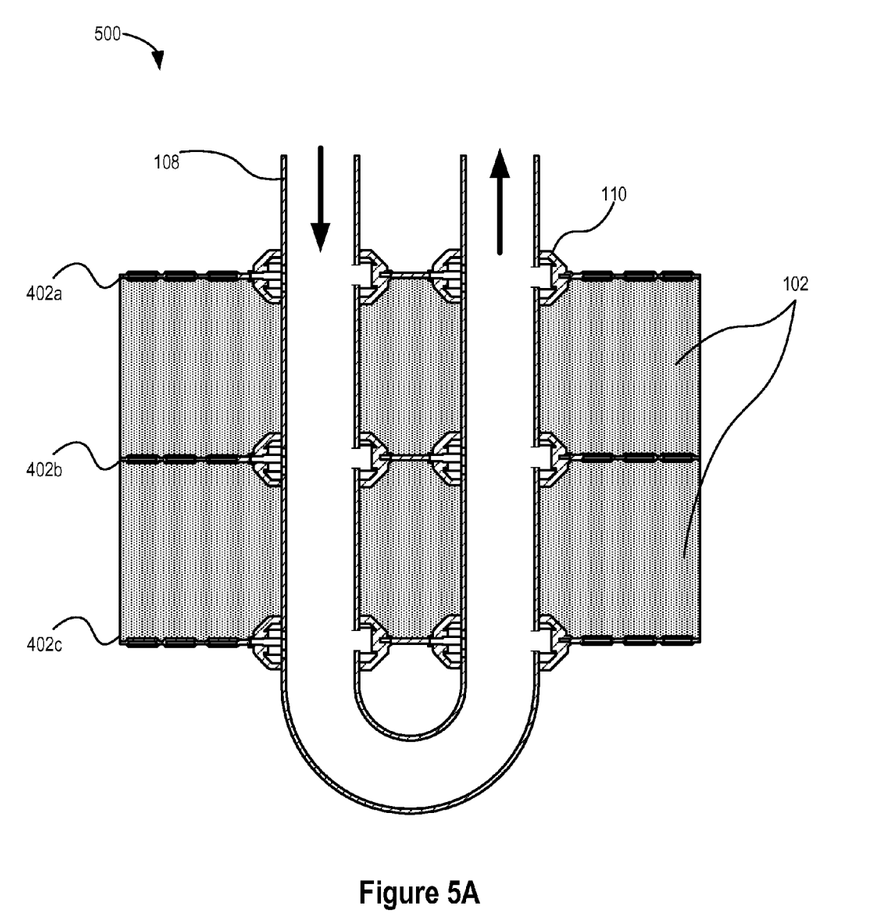
FIG. 5A illustrates a cross sectional view of a battery system and an associated coolant flow direction consistent with embodiments disclosed herein.

FIG. 5A illustrates a cross sectional view of a battery system 500 consistent with embodiments disclosed herein. The battery system 500 may comprise one or more cooling system plates 402a-402c and/or one or more battery packs 102 situated therebetween. The cooling system plates 402a-402c may be assembled in a stacked configuration around the central coolant delivery system 108, and may be configured to circulate coolant through the one or more coolant flow channels defined by one or more cooling plates 402a-402c. Accordingly, when coolant is circulated through the one or more coolant channels, the temperature of the battery packs 102 may be regulated.

In certain embodiments, coolant may be circulated through the central coolant delivery system 108 in a particular direction (e.g., via one or more pumps and/or other associated coolant circulation equipment). For example, as illustrated, coolant may be circulated from an inlet of the central coolant delivery system 108 to an outlet of the central coolant delivery system 108 (e.g., flowing in the direction indicated by the arrows in FIG. 5A) in connection with cooling operations.

Figure 5B:
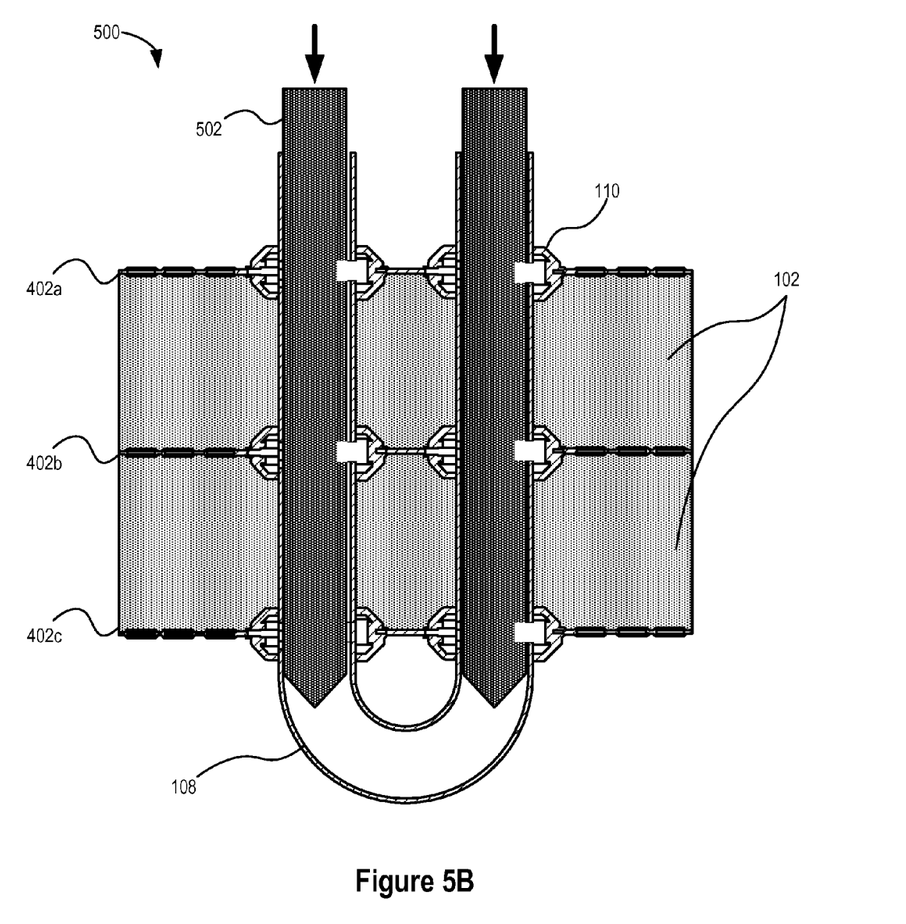
FIG. 5B illustrates a cross sectional view of a battery system and an associated forming mandrel consistent with embodiments disclosed herein.

FIG. 5B illustrates a cross sectional view of a battery system 500 and an associated forming mandrel 502 consistent with embodiments disclosed herein. In certain embodiments, one or more forming mandrels 502 may be inserted and into the central coolant delivery system 108 (e.g., into inlets and/or outlets of the central coolant delivery system 108). In some embodiments, the forming mandrels 502 may further be configured to expand within the central coolant delivery system 108 (e.g., thereby expanding the central coolant delivery system 108) to form one or more seals with seals 110 and/or the cooling system plate 104, thereby allowing coolant flowing through the central coolant delivery system 108 to be circulated into flow channels of the cooling plate 104.

Figure 6:
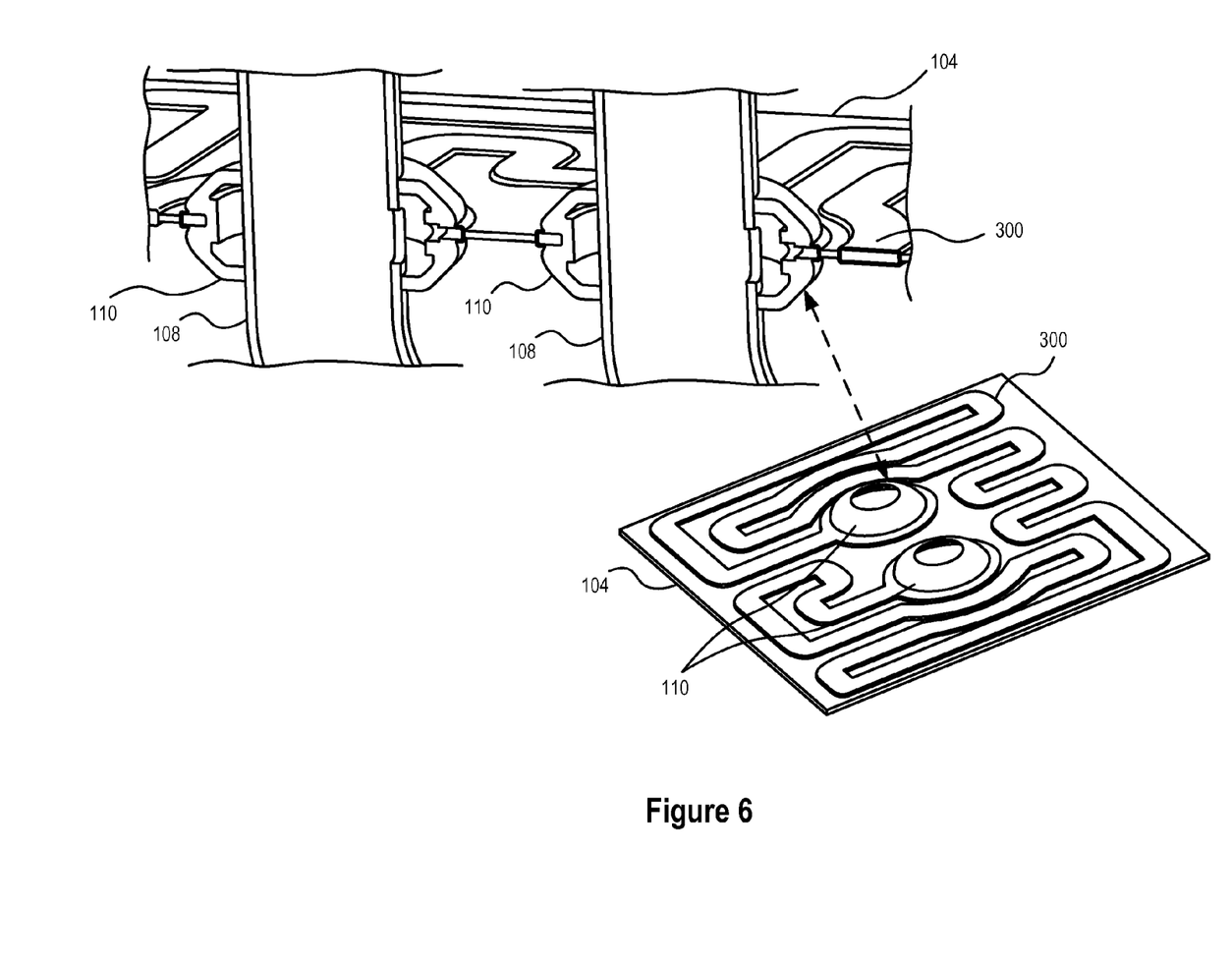
FIG. 6 illustrates a cross sectional view of a seal between a central coolant delivery system and flow channels defined by a cooling plate consistent with embodiments disclosed herein.

FIG. 6 illustrates a cross sectional view of a seal 110 between a central coolant delivery system 108 and flow channels 300 defined by a cooling plate 104 consistent with embodiments disclosed herein. In certain embodiments, the seal 110 may be configured to couple the central coolant delivery system 108 to the cooling system plate 104 (e.g., mechanically couple via a compression fit configuration, an o-ring configuration, and/or the like), thereby allowing coolant flowing through the central coolant delivery system 108 to be circulated into the flow channels of the cooling plate 104. Among other functions, the seal 110 may ensure that coolant does not leak from the interface between the coolant system plate 104 and the central coolant delivery system 108 during operation of the cooling system. In further embodiments, the seal 110 may be configured to align and/or otherwise position the central coolant delivery system 108 relative to the cooling plate 104 during assembly of the cooling system.

In some embodiments, the seal 110 may comprise an o-ring seal. The seal 110 may comprise any suitable material and/or combination of materials including, for example, rubber. In certain embodiments, the seal 110 may comprise one or more metal rings insert modeled into a top and/or bottom portion of the seal 110. In some embodiments, the one or more metal rings may reduce deformation of the seal under pressure. In certain embodiments, the seal 110 film may comprise a material configured to be exposed to coolant and/or other conditions associated with the cooling systems and/or an associated battery system without experiencing significant degradation over time. In further embodiments, the seal 110 may comprise a material that may allow for varied thermal expansion and/or contraction between the central coolant delivery system and the cooling plate 104 while reducing the potential for coolant leaks caused by such expansion and/or contraction.

Figure 7A:
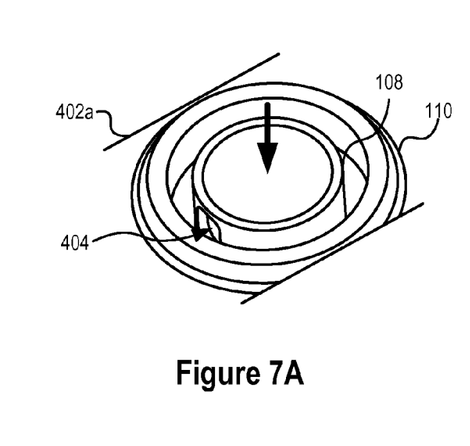
FIG. 7A illustrates a view of an interface between a central coolant delivery system and a cooling plate consistent with embodiments disclosed herein.
Figure 7B:
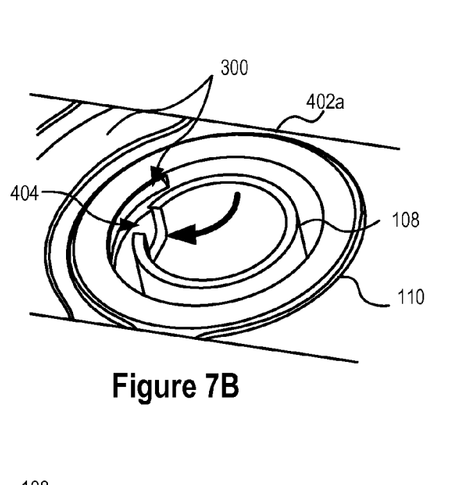
FIG. 7B illustrates another view of an interface between a central coolant delivery system and a cooling plate consistent with embodiments disclosed herein.
Figure 8:
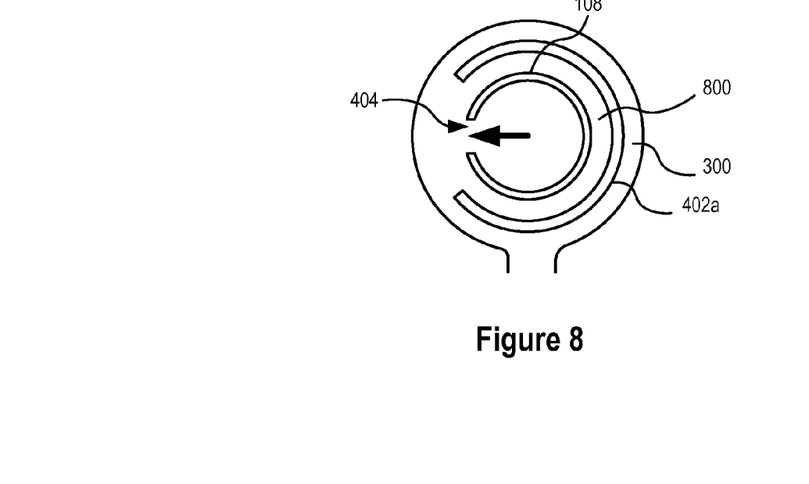
FIG. 8 illustrates a top cross-sectional view of a seal between a central coolant delivery system and a cooling plate consistent with embodiments disclosed herein.

FIGS. 7A-7B illustrate an exemplary interface between a central coolant delivery system 108 and a cooling plate 402a consistent with embodiments disclosed herein. FIG. 8 illustrates a simplified top cross-sectional view of a seal 110 between a central coolant delivery system 108 and a cooling plate 402a consistent with embodiments disclosed herein. As illustrated, coolant distribution openings 404 of the central coolant delivery system 108 may be configured to align with one or more coolant flow channels 300 defined by the cooling plate 402a. Accordingly, when coolant is circulated through the central coolant delivery system 108, the coolant may flow into the coolant flow channels 300 defined by the cooling plate 402a via the coolant distribution openings 404 (e.g., in the direction indicated by the arrows in FIGS. 7A-7B and FIG. 8). In further embodiments, coolant may also circulate in a cavity 800 defined by the seal 110 during operation of the cooling system.

Figures 9A, 9B:
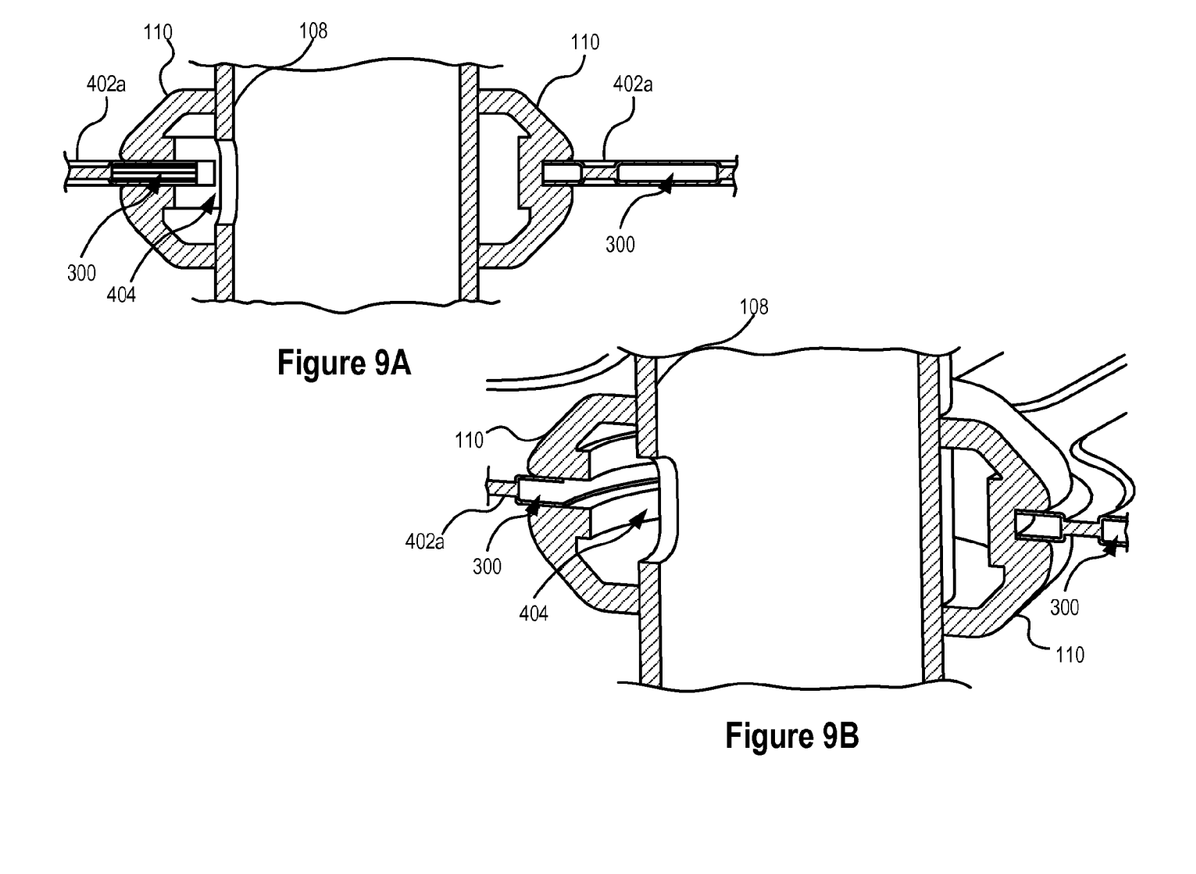
FIG. 9A illustrates a cross sectional view of an interface between a central coolant delivery system and flow channels defined by a cooling plate consistent with embodiments disclosed herein.
FIG. 9B illustrates another cross sectional view of an interface between a central coolant delivery system and flow channels defined by a cooling plate consistent with embodiments disclosed herein.

FIGS. 9A-9B illustrate cross sectional views of an interface between a central coolant delivery system 108 and flow channels 300 defined by a cooling plate 402a consistent with embodiments disclosed herein. As illustrated, a seal 110 (e.g., an o-ring and/or the like) may couple the central coolant delivery system 108 to the cooling system plates 402a-402c. Among other things, the seal 110 may ensure that coolant does not leak from the interface between the coolant system plate 402a and the central coolant delivery system 108 when coolant is circulated from the central coolant delivery system 108 to the flow channels 300 through coolant distribution openings 404 of the central coolant delivery system 108 and/or facilitate proper mechanical alignment of the same during assembly and/or operation.

Figure 10A:
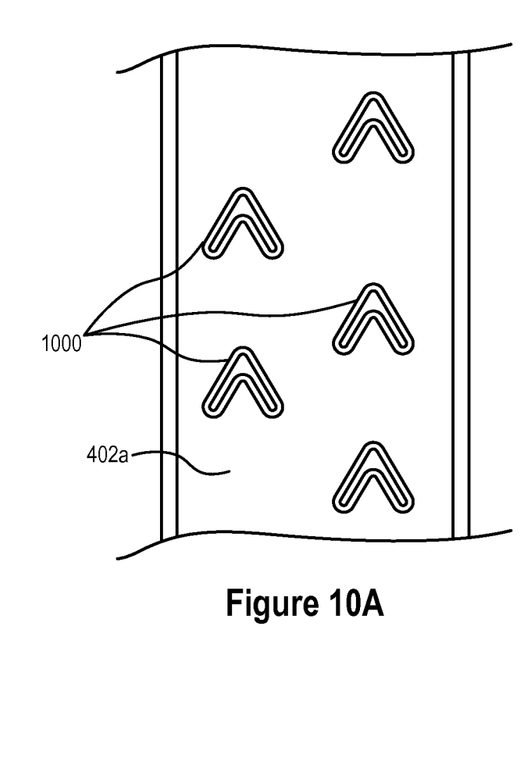
FIG. 10A illustrates an exemplary turbulator design included in a flow channel of a cooling plate consistent with embodiments disclosed herein.
Figure 10B:
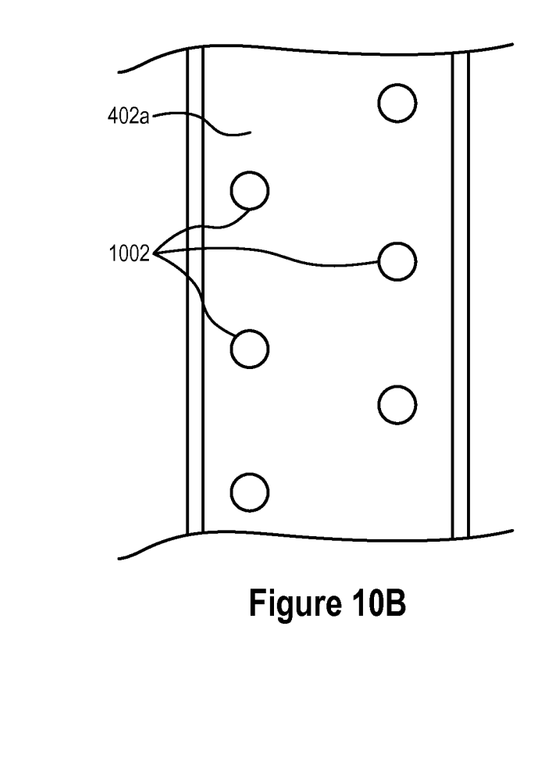
FIG. 10B illustrates another exemplary turbulator design included in a flow channel of a cooling plate consistent with embodiments disclosed herein.

FIGS. 10A-10B illustrate exemplary turbulator designs included in a flow channel of a cooling plate 402 consistent with embodiments disclosed herein. In some embodiments, flow channels may comprise one or more areas incorporating turbulators. A turbulator may comprise one or more features defined by the flow channels configured to create more turbulent flow of coolant through the flow channels during operation, thereby improving thermal performance of the cooling system. A turbulator may comprise one or more raised and/or depressed features included in a wall of a flow channel that, in some embodiments, may be in a patterned configuration. A turbulator may be formed in a variety of ways including, without limitation, stamping, machining, molding, casting, and/or the like.

For example, as illustrated in FIG. 10A, a turbulator may comprise a pattern of one or chevron features included in a wall of a flow channel. Similarly, as illustrated in FIG. 10B, a turbulator may comprise a pattern of one or more circular features (i.e., a bubble) included in a wall of a flow channel. It will be appreciated that a wide variety of turbulator features, patterns, and/or configurations may be utilized in connection with the disclosed embodiments, and that any suitable turbulator features, patterns, and/or configurations designed to create more turbulent flow of coolant in a flow channel may be utilized in connection with embodiments disclosed herein.

In some embodiments, a turbulator may be incorporated into an area of a central coolant delivery system facilitating coolant flow. In further embodiments, a turbulator may comprise a separate component mechanically affixed to a flow channel of an associated cooling plate 402 and/or a central coolant delivery system.

It will be appreciated that a number of variations can be made to the embodiments of the geometries and/or configurations presented in connection with FIG. 1-10B within the scope of the inventive body of work. Accordingly, it will be appreciated that FIGS. 1-10B are provided for purposes of illustration and explanation and not limitation.

Figure 11:
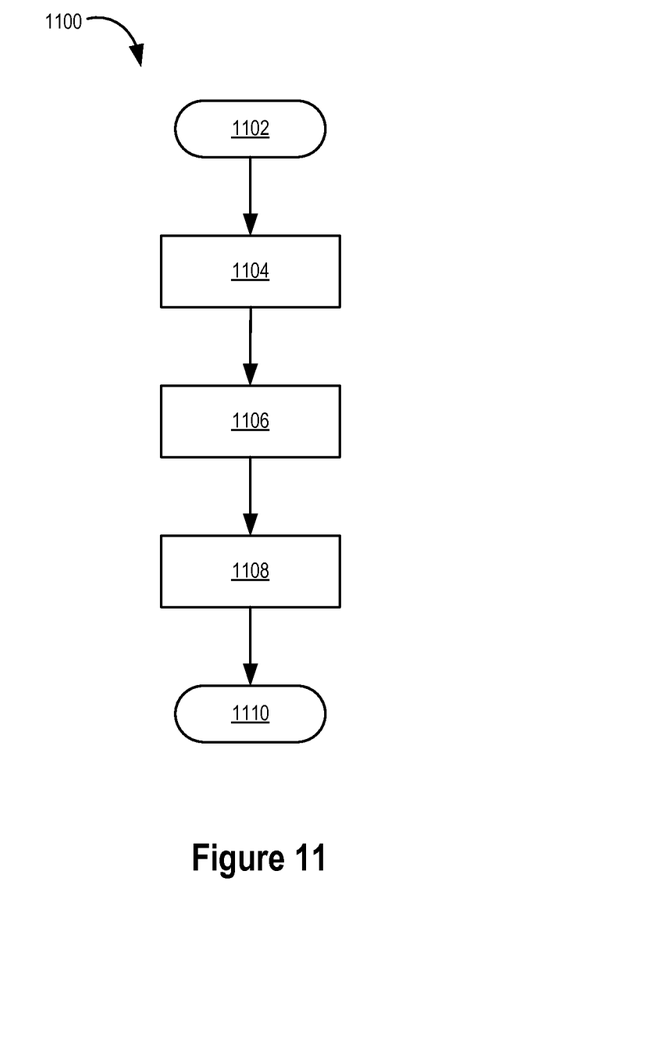
FIG. 11 illustrates a flow chart of an exemplary method of assembling a cooling system consistent with embodiments disclosed herein.

FIG. 11 illustrates a flow chart of an exemplary method 1100 of assembling a cooling system consistent with embodiments disclosed herein. At 1102, the method 1100 may be initiated. At 1104, one or more cooling system plates may be assembled in a stacked configuration. One or more seals may be mechanically installed in one or more central cooling delivery system openings of the one or more cooling system plates at 1106. In certain embodiments, the one or more seals may be configured to couple the central coolant delivery system to the cooling system plates, thereby allowing coolant flowing through the central coolant delivery system to be circulated into flow channels of the cooling plates without coolant leaking from the interface.

At 1108, the central cooling delivery system may be disposed within openings defined by the installed seals. In some embodiments, the central cooling delivery system and/or the installed seals may be sized such that when properly aligned, a seal is formed that may be substantially leak free. In further embodiments, the central cooling system may be expanded internally such that a substantially leak free seal is formed between the central cooling delivery system and/or the seal and associated cooling plate. For example, in certain embodiments, one or more mandrels may be inserted into open ends of the central coolant delivery system and be configured to expand the central cooling delivery system and form a substantially leak free seal between the central cooling delivery system and/or an associated seal/cooling system plate. The method 1100 may end at 1110.

Although the foregoing has been described in some detail for purposes of clarity, it will be apparent that certain changes and modifications may be made without departing from the principles thereof. Additionally, certain systems and/or methods disclosed herein may be utilized in a liquid-cooled battery system not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A battery cooling system comprising:
    a plurality of cooling plates, each cooling plate comprising at least one coolant flow channel;
    a single integrally-formed discrete central cooling delivery system configured to interface with each of the coolant flow channels of the plurality of cooling plates via a plurality of coolant delivery system openings, each coolant delivery system opening being defined in an interior location on the plurality of cooling plates, the central cooling delivery system being configured to circulate coolant through the coolant flow channels of the plurality of cooling plates as coolant is circulated from an inlet of the central cooling delivery system to an outlet of the central cooling delivery system; and
    a plurality of seals, each seal configured to seal an interface between the central cooling delivery system and the plurality of cooling plates when the central cooling delivery system is expanded using one or more forming mandrels.

2. The battery cooling system of claim 1, wherein the plurality of cooling plates are arranged in a stack configuration.

3. The battery cooling system of claim 1, wherein each seal of the plurality of seals comprises an o-ring seal.

4. The battery cooling system of claim 1, wherein each seal of the plurality of seals is configured to provide a mechanical seal the interface between the central cooling delivery system and the plurality of cooling plates.

5. The battery cooling system of claim 1, wherein each cooling plate comprises a first sheet and a second sheet.

6. The battery cooling system of claim 5, wherein the first sheet and second sheet are joined together using a brazing process to form the cooling plate.

7. The battery cooling system of claim 5, wherein at least one of the first sheet and the second sheet define at least a part of a coolant flow channel.

8. The battery cooling system of claim 1, wherein each coolant flow channel comprises at least one turbulator.

9. The battery cooling system of claim 8, wherein the turbulator comprises a plurality of raised features within the coolant flow channel arranged in a pattern configuration.

10. The battery cooling system of claim 8, wherein the turbulator comprises a plurality of depressed features within the coolant flow channel arranged in a pattern configuration.

11. The battery cooling system of claim 1, wherein the central cooling delivery system comprises at least one turbulator.

12. The battery cooling system of claim 11, wherein the turbulator comprises a plurality of raised features within the coolant flow channel arranged in a pattern configuration.

13. The battery cooling system of claim 11, wherein the turbulator comprises a plurality of depressed features within the coolant flow channel arranged in a pattern configuration.

14. The battery cooling system of claim 1, wherein at least one surface of each cooling plate is coated with an isolation film.

15. The battery cooling system of claim 2, wherein the stack configuration comprises a plurality of spaces between the plurality of cooling plates, each space configured to retain a battery pack.

16. The battery cooling system of claim 2, wherein at least a portion of the plurality of cooling plates comprise one or more members configured to maintain a particular spacing between the plurality of cooling plates in the stack configuration.

* * * * *